(No Model.)
G. H. REYNOLDS.
ENGINE GOVERNOR.
No. 285,679. Patented Sept. 25, 1883.
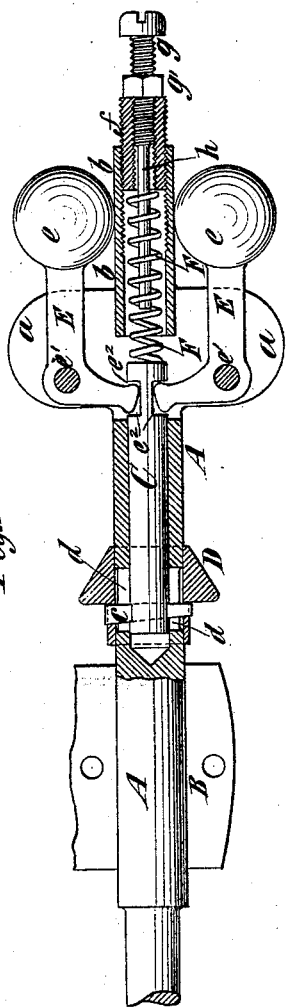
Witnesses:
Jno Haynes
Ed. L. Moran
Inventor:
George H. Reynolds
by his Attorneys
Brown & Brown

UNITED STATES PATENT OFFICE.

GEORGE H. REYNOLDS, OF NEW YORK, N. Y., ASSIGNOR OF ONE-HALF TO CORNELIUS H. DELAMATER, GEORGE H. ROBINSON, AND WILLIAM DELAMATER, OF SAME PLACE.

ENGINE-GOVERNOR.

SPECIFICATION forming part of Letters Patent No. 285,679, dated September 25, 1883.

Application filed July 27, 1883. (No model.)

*To all whom it may concern:*

Be it known that I, GEORGE H. REYNOLDS, of the city and county of New York, in the State of New York, have invented a new and useful Improvement in Engine-Governors, of which the following is a specification.

My invention consists in a ball-governor of novel construction, which is secured or attached directly to the end of a rotary shaft, so that its axis of rotation is concentric with the axis of the shaft, while its balls swing in a plane parallel with the axis of the shaft, and which may be employed to shift and control the valve-gear of a steam, gas, or hot-air engine, or for regulating or controlling other mechanism.

In the accompanying drawings, Figure 1 is a longitudinal section of a portion of a shaft and a governor embodying my invention, and Fig. 2 is a side view of the shaft and governor.

Similar letters of reference designate corresponding parts in both figures.

A designates a shaft, and B a bearing wherein it may turn. So far as relates to my invention, this shaft may be supposed to be geared to the crank-shaft of an engine; or it may be supposed to be driven in any other suitable manner. It may, for example, be a shaft carried by an elevator-car, and to which it is desired to apply a governor to throw a safety appliance into operation when the speed of the car increases beyond a safe or desirable limit.

At the end of the shaft A are pairs of lugs or ears $a$, and projecting beyond them is a tubular socket, $b$. The lugs or ears $a$ and the socket $b$ form, in reality, the frame of the governor, and they may be formed integrally with the shaft, as here shown, by forging; or they may be formed separately by casting or forging, and secured upon the end of the shaft.

The shaft A for some distance from its end is bored out, forming a central cavity or bore, in which is fitted a sliding rod or spindle, C, and on the exterior of the said shaft is fitted a sliding cone, D, which is connected with the rod or spindle C by a key or pin, $c$, inserted through the hub of the cone and the rod C, and working in a slot, $d$, in the shaft A; hence it will be seen that by shifting the rod longitudinally in the shaft, the cone will be correspondingly shifted upon the exterior of the shaft.

E designates the governor-arms, which carry balls $e$, and which are fulcrumed at $e'$ between the lugs or ears $a$ of the two pairs, so that said arms may swing outward and inward in a plane parallel with the axis of the shaft A. The inner ends of the arms E engage with the notches $e^2$ in the sliding rod C, and hence as the arms swing outward or inward the said rod will be slid in or out in the shaft A, and the cone D will be correspondingly moved.

In the outer end of the socket or tube $b$ is an externally-screw-threaded nut or sleeve, $f$, which may be screwed into or out of the socket or tube.

F designates the spring, which forms a resistance device to oppose the swinging outward of the governor-arms. One end of this spring bears against the end of the rod or spindle C, and the other end bears against the nut or sleeve $f$; hence it will be seen that by adjusting the nut the tension of the spring may be increased or diminished.

In the nut or sleeve $f$ is screwed a set-screw, $g$, which is provided with a jam-nut, $g'$, for holding it against turning.

Within the spring $f$ is a stop rod or pin, $h$, one end of which bears against the end of the set-screw $g$. When the arms E swing outward, they move the sliding rod C outward and into the tube or socket $b$ until the end of said sliding rod strikes against the stop rod or pin $h$, whereby its further movement is prevented. By adjusting the set-screw $g$, the range of movement allowed for the governor may be varied. It will be observed that the axis of rotation of the governor is concentric with the shaft A.

Where the cone D is used in an engine-governor, it serves simply to vary the position of parts of the valve-operating gear, and so vary indirectly the point of cut-off in the engine; or the cone may vary the degree of opening allowed for the throttle-valve; or I may substitute for the cone a cam having its face inclined or tapered lengthwise of the shaft, and the cam may be moved in a similar manner to give a greater or less opening to the valve.

The valve-operating gear or other devices on which the cone or cam acts are not shown, as they do not form any part of this invention.

What I claim as my invention, and desire to secure by Letters Patent, is—

1. The combination, with a rotary shaft, of a governor-frame formed upon or secured to the end thereof, a sliding rod fitting within the shaft, and a sliding cone or cam fitted to the outside of the shaft, and connected with said rod, and governor-arms pivoted in said frame, so as to swing in a plane parallel with the axis of said shaft, and connected with said sliding rod, substantially as and for the purpose described.

2. The combination of the shaft A, having the lugs or ears $a$ formed integrally with it, the sliding rod C, and the cone or cam D, connected with said rod, and the governor-arms E, pivoted to said lugs or ears and engaging with said sliding rod, substantially as described.

3. The combination, with the shaft A and the sliding rod C, of the governor-frame comprising the lugs or ears $a$ and socket or tube $b$, the governor-arms E, the spring F, the externally-screw-threaded nut $f$, the stop pin or rod $h$, and the set-screw $g$, substantially as described.

GEO. H. REYNOLDS.

Witnesses:
FREDK. HAYNES,
T. J. KEANE.